United States Patent [19]
Gallagher et al.

[11] Patent Number: 5,712,033
[45] Date of Patent: Jan. 27, 1998

[54] ASPHALT-CONTAINING ORGANIC FIBERS

[75] Inventors: Kevin P. Gallagher, Pataskala; Donn R. Vermilion, Newark, both of Ohio

[73] Assignee: Owens-Corning Fiberglass Technology, Inc., Summit, Ill.

[21] Appl. No.: 689,198

[22] Filed: Aug. 5, 1996

[51] Int. Cl.$^6$ .................... D02G 3/00; C08J 3/04
[52] U.S. Cl. .................... 428/364; 428/373; 524/64
[58] Field of Search .................... 428/364, 373, 428/374, 372; 524/64

[56] References Cited

U.S. PATENT DOCUMENTS

| | | |
|---|---|---|
| 707,485 | 8/1902 | Wishart et al. . |
| 1,289,892 | 12/1918 | Perry . |
| 2,824,048 | 2/1958 | Hupe et al. . |
| 2,904,453 | 9/1959 | Labino . |
| 3,144,376 | 8/1964 | Plumberg et al. . |
| 3,291,767 | 12/1966 | Zaayenga . |
| 3,632,415 | 1/1972 | Franklin et al. .......... 117/126 AB |
| 3,639,953 | 2/1972 | Kimura et al. ............ 23/209.1 |
| 3,745,060 | 7/1973 | Jumentier et al. . |
| 3,852,428 | 12/1974 | Powell et al. ............ 423/447 |
| 3,861,971 | 1/1975 | Stapleford et al. ........ 156/62.2 |
| 3,886,021 | 5/1975 | Breckenfelder ........... 156/246 |
| 4,117,051 | 9/1978 | Ishikawa et al. .......... 264/29.1 |
| 4,166,752 | 9/1979 | Marzocchi et al. ........ 106/273 N |
| 4,394,481 | 7/1983 | Grossi et al. ............ 525/54.5 |
| 4,399,186 | 8/1983 | Lauderback ............. 428/291 |
| 4,419,489 | 12/1983 | Grossi et al. ............ 525/54.5 |
| 4,436,767 | 3/1984 | Grossi et al. ............ 427/138 |
| 4,436,864 | 3/1984 | Grossi et al. ............ 524/458 |
| 4,636,414 | 1/1987 | Tajima et al. ............ 428/40 |
| 4,696,847 | 9/1987 | Cousin et al. ............ 428/76 |
| 4,762,652 | 8/1988 | Miyamori et al. ........ 264/6 |
| 4,820,078 | 4/1989 | Brocious ................ 404/92 |
| 4,871,605 | 10/1989 | Pagen et al. ............ 428/141 |
| 4,996,037 | 2/1991 | Berkebile et al. ........ 423/447.4 |
| 5,064,714 | 11/1991 | Yamaguchi et al. ....... 428/219 |
| 5,091,072 | 2/1992 | Tsuchitani et al. ....... 208/39 |
| 5,213,677 | 5/1993 | Yamamoto et al. ....... 208/39 |
| 5,242,493 | 9/1993 | Glynn, Jr. et al. ....... 106/273 |
| 5,326,241 | 7/1994 | Rook et al. ............. 425/7 |
| 5,468,546 | 11/1995 | Loftus et al. ........... 428/280 |
| 5,494,728 | 2/1996 | Vermilion et al. ........ 428/143 |
| 5,543,211 | 8/1996 | Gallagher et al. ........ 428/224 |

FOREIGN PATENT DOCUMENTS

| | | |
|---|---|---|
| 0363130 | 4/1990 | European Pat. Off. . |
| 59-001725 | 1/1984 | Japan . |
| 9500453 | 1/1995 | WIPO . |

OTHER PUBLICATIONS

Technical Bulletin, Shell Chemical Company, SC: 57–84, "KRATON®Thermoplastic Rubber In Asphalt Products," 1984.

J. G. Spreight, "The Chemistry and Technology of Petroleum," Marcel Dekker Inc., New York, 1991, pp. 16, 19–21, 482–486.

S.E. Moschopedis et al., "The Effect of Air Blowing on the Properties and Constitution of a Natural Bitumen," Journal of Materials Science 12, 1977, pp. 990–998.

Patent Abstracts of Japan, vol. 8, No. 77 (C-218), Apr. 10, 1984, abstract of JP 59001725.

Derwent Abstract No. 96–056603, abstract of JP 7316929, Dec. 5, 1995.

*Primary Examiner*—Newton Edwards
*Attorney, Agent, or Firm*—C. Michael Gegenheimer; Toni-Junell Herbert

[57] ABSTRACT

Asphalt/polymer fibers include, by weight, 30% to 85% polymeric material and 15% to 70% asphaltic material, where the polymeric material has a melt flow index of no more than about 35 grams/10 minutes. Preferably, the combination of polymeric material and asphaltic material has a melt flow index of from 80 grams/10 minutes to 800 grams/10 minutes. The asphaltic material is preferably asphalt having a softening point of from 82° C. to 177° C. The polymeric material is preferably a polymer selected from polypropylene, polyethylene, polystyrene, polyesters, ethylene copolymers, acrylates, methacrylates, and mixtures of these polymers. The organic fibers of asphalt/polymer may be intermingled with mineral reinforcing fibers and formed into products such as mats.

15 Claims, 4 Drawing Sheets

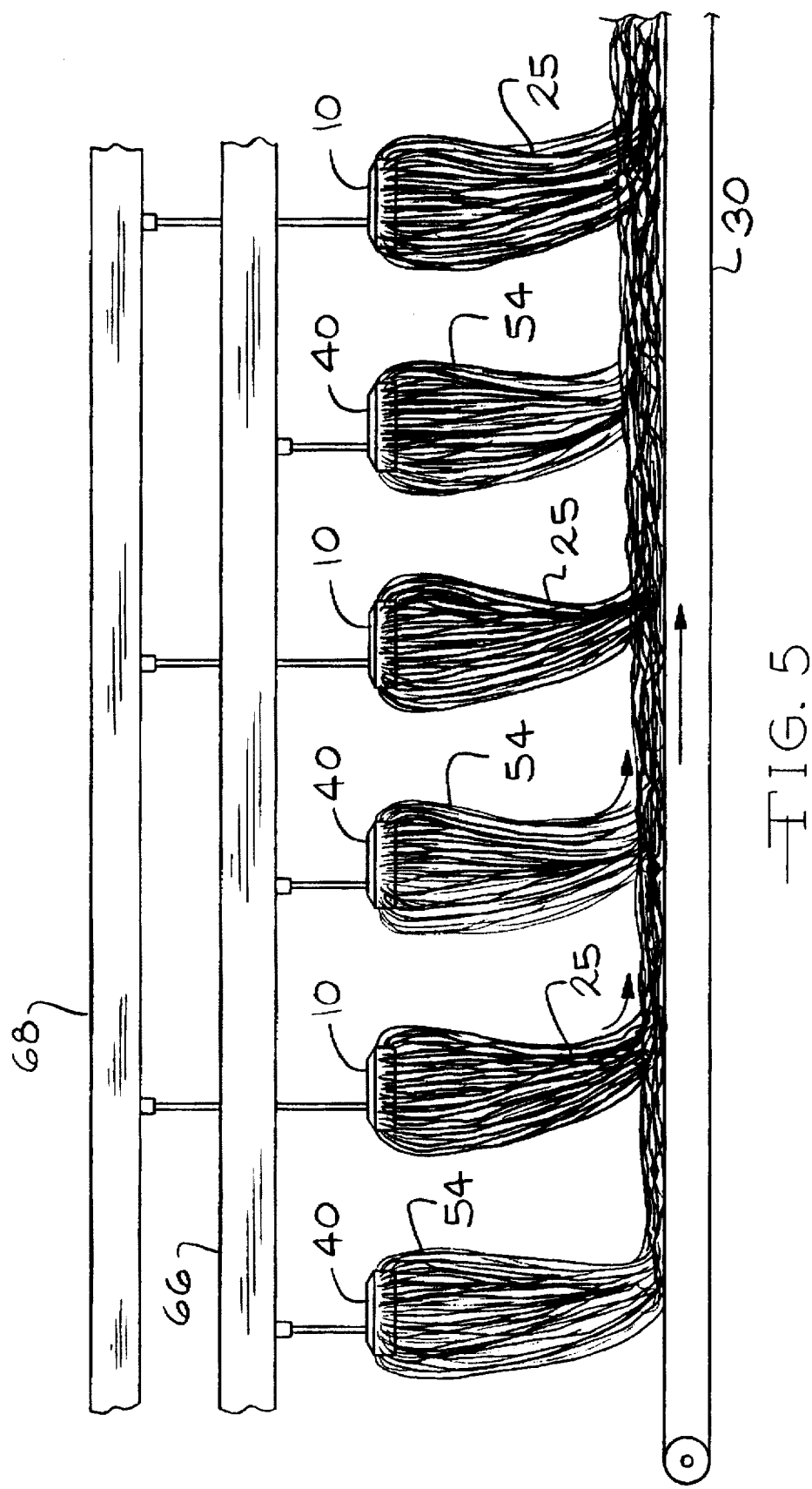

ASPHALT-CONTAINING ORGANIC FIBERS

FIELD AND INDUSTRIAL APPLICABILITY OF THE INVENTION

This invention relates in general to organic fibers. More particularly, this invention relates to asphalt/polymer fibers. Asphaltic material lowers the viscosity of molten polymeric material to form an organic combination suitable for fiberizing. The resulting fibers have industrial applicability, e.g., in thermal and acoustical insulation, sorbent products such as oil sorbents, filters, and stuffing/padding materials.

BACKGROUND OF THE INVENTION

Products such as insulation and structural products have been made from mineral fibers, particularly glass fibers, for some time. A well-known rotary process of making mineral fibers includes centrifuging molten mineral material through small orifices to form mineral fibers. Molten mineral material is supplied to a rotating annular spinner. The spinner has a peripheral wall with a plurality of small orifices. The spinner is heated to keep the mineral material in the molten state. As the spinner is rotated, centrifugal force moves the molten mineral material against the peripheral wall. The molten mineral material is centrifuged from the rotating spinner and forced through the orifices in the peripheral wall of the spinner to form mineral fibers. This process provides an efficient way of producing mineral fibers at high production rates.

Many uses for polymeric fibers, such as polymer fibers, have been developed because of the desirable qualities of organic fibers. For example, polymeric fibers can be used to produce insulation products having a great degree of flexibility. Polymeric fibers are more resistant to breaking under deflection than glass fibers in typical insulation products. These polymeric fiber insulation products also have better handleability than glass fibers because they do not irritate the skin. Polymeric fibers can be used in a wide range of applications including sorbent materials, thermal and acoustical insulation, filters, and stuffing/padding materials.

To take advantage of the proven efficiency and high production rates of the rotary process of producing mineral fibers, it would be desirable to be able to produce organic fibers, including polymer fibers, in a similar way. But molten polymeric material has different physical properties from a molten mineral material. Some molten polymeric materials have decomposition temperatures that limit the upper spinner temperature. As a result, these materials are too viscous for producing fibers by a rotary process at the temperatures where they can be processed. For example, polypropylene with a melt flow index below 35 is unsuitable for a rotary fiberizing process. It would be possible to provide a polymeric material having a higher melt flow index. However, the cost of such a material would be significantly higher. Therefore, it would be desirable to be able to use a rotary process to make fibers from polymeric materials having a low melt flow index.

SUMMARY OF THE INVENTION

The above object as well as other objects are achieved by organic fibers according to the present invention. The fibers are made from a combination of ingredients comprising from about 30 wt. % to about 85 wt. % polymeric material and from about 15 wt. % to about 70 wt. % asphaltic material (unless indicated otherwise, all percentages herein are by weight). Of course, the percentage amounts of these and any other ingredients in the combination add up to 100 percent.

The polymeric material is preferably a polymer selected from polypropylene, polyethylene, polystyrene, polyesters, ethylene copolymers, acrylates, methacrylates, and mixtures thereof. The polymeric material has a melt flow index of about 35 grams/10 minutes and below as measured according to ASTM D 1238 Method B. For example, a preferred polymeric material is polypropylene having a melt flow index of less than 35 g/10 min. at 230° C. under a 2.16 kg load.

The addition of the asphaltic material to the polymeric material lowers the viscosity of the resulting composition to make it suitable for fiberizing. Preferably, the asphalt-containing composition has a melt flow index of from about 80 grams/10 minutes to about 800 grams/10 minutes as measured at 230° C. under a 2.16 kg load according to ASTM D 1238 Method B. The asphaltic material is preferably asphalt having a softening point of from about 82° C. to about 177° C.

BRIEF DESCRIPTION OF THE DRAWINGS

FIG. 5 is a schematic view in elevation of apparatus for alternately commingling veils of asphalt-containing polymeric fibers and veils of mineral fibers.

DETAILED DESCRIPTION AND PREFERRED EMBODIMENTS OF THE INVENTION

Figure 1:
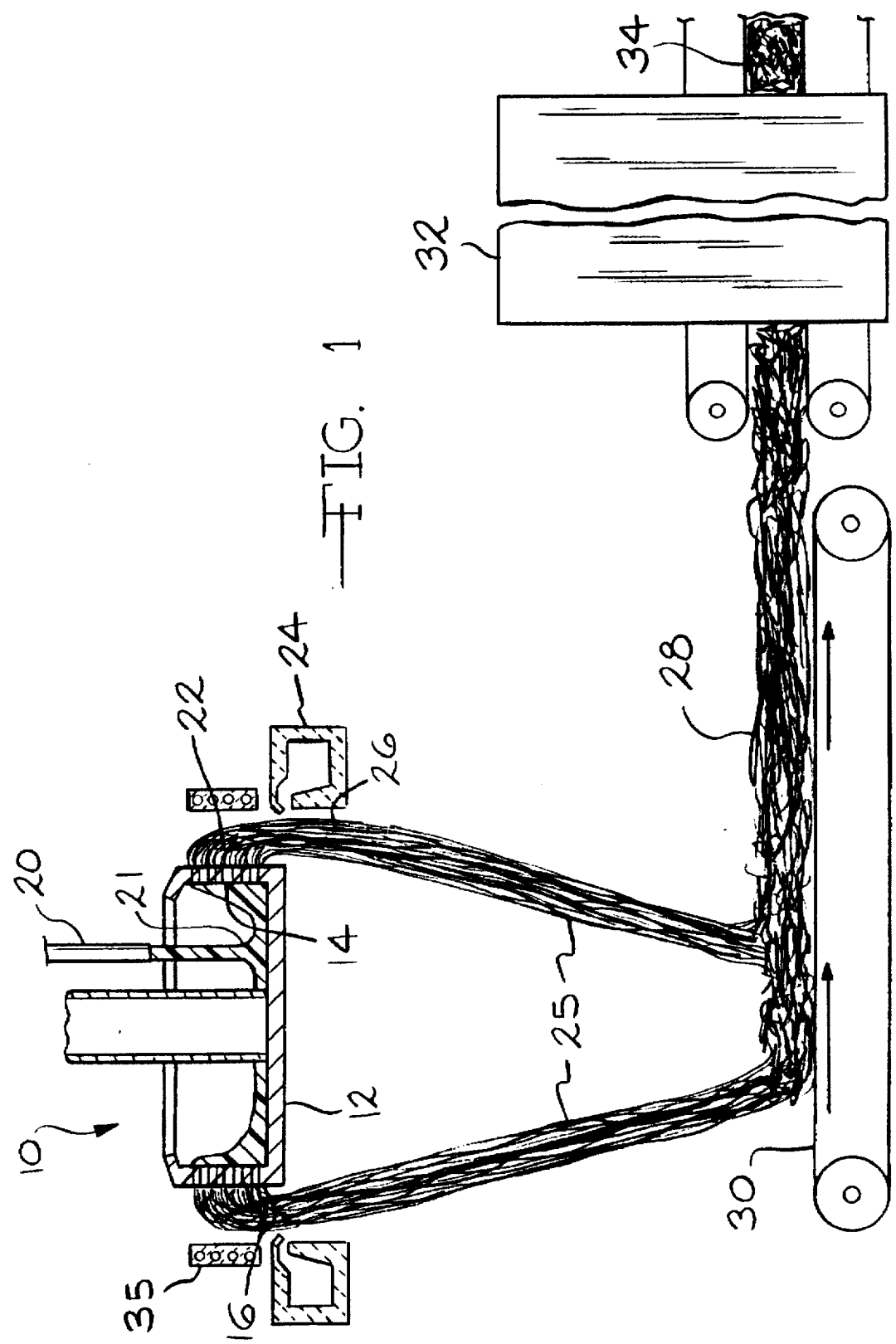
FIG. 1 is a schematic sectional view in elevation of an apparatus for centrifuging asphalt-containing or asphalt-modified fibers according to the invention.

Referring now to the drawings, FIG. 1 illustrates an apparatus for producing asphalt-containing polymeric fibers by a rotary process. The apparatus includes rotatably mounted spinner 10 which is comprised generally of spinner bottom wall 12 and spinner peripheral wall 14. The spinner can be cast from a nickel/cobalt/chromium alloy typically used for the production of mineral fibers, or can be any other suitable spinner, such as one of welded stainless steel. The spinner peripheral wall has numerous orifices 16 for the centrifugation of fibers, preferably from about 500 to about 25,000 orifices.

Molten asphalt-modified polymeric material is discharged into the rotating spinner 10 from a delivery tube 20 as stream 21. Preferably, the molten material is discharged with enough momentum to overcome any turbulence in the spinner cavity, and more preferably with a momentum of more than about 100 g cm/sec$^2$. Any means such as a restricting orifice (not shown) at the termination of the delivery tube can be used to provide the momentum. Upon reaching the spinner bottom wall, the molten material is driven radially outward and up the peripheral wall, where centrifugal force forces it through the orifices as streams or primary fibers 22. After emanating from the spinner, the primary fibers are directed downward by annular blower 24 to form a downwardly moving flow or veil 25 of asphalt-containing polymeric fibers. Any suitable means can be used for turning the fibers from a generally radially outward path to a path directed toward a collection surface.

In one embodiment of the invention, centrifugal attenuation by the rotation of the spinner is sufficient to produce fibers of the desired diameter, and no further attenuation is needed. The centrifuging process provides acceleration to the molten organic material sufficient to produce primary fibers having an average diameter of about 60 microns or below, preferably from about 5 microns to about 35 microns, and more preferably from about 5 microns to about 20 microns, with a coefficient of variation of less than 2 (coefficient of variation=standard deviation/average.)

In another embodiment of the invention, secondary attenuation is used to further attenuate the primary fibers. The blower is supplied with sufficient air pressure to pull the primary fibers and further attenuate them into the desired final fiber diameter. As shown in FIG. 1, the blower attenuates the primary fibers into final fibers 26, which are collected as fiber web 28 on any suitable collection surface, such as conveyor 30.

Figure 3:
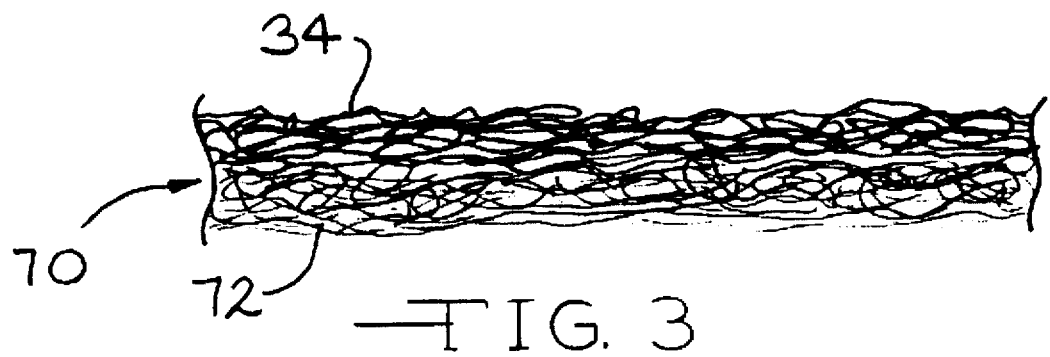
FIG. 3 is a schematic cross-sectional view in elevation of a laminate containing a mat of asphalt-containing polymeric fibers and a mat of reinforcing material.

Subsequent to the fiber-forming step, the fiber web may be transported through any further processing steps, such as oven 32, to result in the final product, such as mat 34. The mat 34 containing asphalt-modified polymeric fibers is shown in more detail in FIG. 3. The mat 34 is porous, having a porosity of from about 566 liters/minute to about 1,416 liters/minute on a 2.54 centimeter square sample with a 1.27 centimeter water pressure drop. Preferably, the mat has a porosity from about 850 liters/minute to about 1,133 liters/minute. The mat has a density of from about 8 kg/m$^3$ to about 160 kg/m$^3$, more preferably from about 48 kg/m$^3$ to about 80 kg/m$^3$. In addition, the mat has a high degree of flexibility and conformability when compared to a film of asphalt-modified polymeric material having the same thickness.

Figure 2:
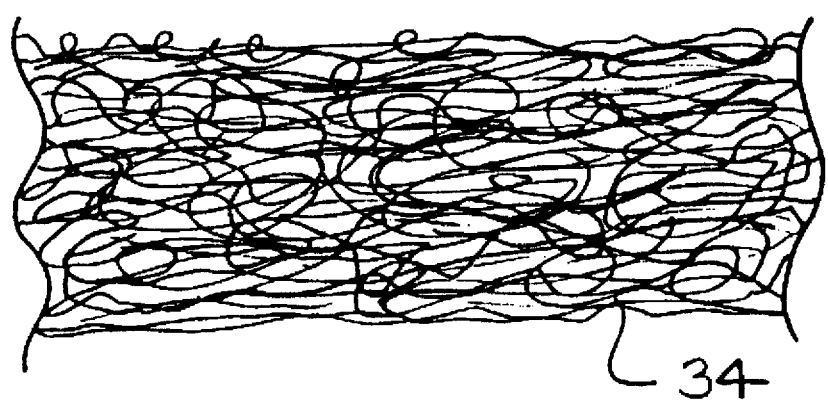
FIG. 2 is a schematic cross-sectional view in elevation of a mat of fibers of the invention.

As shown in FIG. 2, a laminated mat 70 can be formed by laminating together a mat 34 of the fibers and a reinforcement layer, such as a continuous mineral fiber mat 72. The laminated mat can be used in many different reinforcement applications as well as other applications. For example, the laminated mat can be used as a stress-absorbing membrane interlayer in various construction applications, such as highway construction.

Optionally, heating means 35 is used to heat either the spinner or the primary fibers, or both, to facilitate the fiber attenuation. A supply of hot air is a preferred heating means. By heating the primary fibers, the process of further attenuation into the final fibers is enhanced. Even without the need for secondary attenuation by the blower, an auxiliary heat source can be used to maintain the temperature of the asphalt/polymer material at the level for optimum centrifugation into fibers. Other heating means for the spinner can be employed, such as electric resistance heating. The temperature of the peripheral wall of the spinner is preferably from about 200° C. to about 300° C., and more preferably from about 230° C. to about 290° C.

The polymeric material for use in this invention can include organic polymers, thermoplastic resins, other thermoplastic organic materials, and suitable thermosetting organic materials. As used herein, the term "polymeric organic material" refers to the non-asphaltic organic component of the composition. Preferably, the polymeric material is a polymer or resin. More preferably, the polymeric material is a low-cost commodity-grade polymer selected from polypropylene, polyethylene, polystyrene, polyesters, ethylene copolymers, ethylene/propylene copolymers, acrylates, methacrylates, and mixtures thereof. Even more preferably, the polymer is a polypropylene. Blends of different polymeric materials can also be used.

The viscosity of the unmodified molten polymeric material is too high for fiberizing by a rotary process. The viscosity of the polymeric materials is measured by a melt flow index, where a lower melt flow index indicates a higher viscosity. Preferably, the unmodified polymeric material has a melt flow index below about 35 grams/10 minutes as measured according to ASTM D 1238 Method B. A preferred polymeric material is polypropylene having a melt flow index below about 35 g/10 min. at 230° C. under a 2.16 kg load. In some embodiments, the polymeric material has a melt flow index below about 25 grams/10 minutes, and even below about 15 grams/10 minutes. A particularly preferred material is a polypropylene polymer having a melt flow index from about 5 grams/10 minutes to about 15 grams/10 minutes.

Exemplary asphaltic materials include bituminous materials such as a naturally occurring asphalt or a manufactured asphalt produced by refining petroleum. Preferred asphalts include straight-run fractional-derived asphalts, cracked asphalts, and asphalts derived from processing such as asphalt oxidizing, propane deasphalting, steam distilling, chemical modifying, and the like. The asphalt can be either modified or unmodified. In preferred embodiments, the asphalt is a roofing flux asphalt or a paving-grade asphalt. Other types of suitable asphalts include specialty asphalts such as water-proofing asphalts, battery compounds, and sealers. Blends of different kinds of asphalt can also be used.

A preferred asphalt has a softening point from about 82° C. to about 177° C. More preferably, the asphalt has a softening point from about 93° C. to about 132° C. The softening point of the asphalt is typically measured by the ring-and-ball method according to ASTM D 36. Even more preferably, the asphalt is that which has been subjected to an oxidizing process, such as air blowing, to give the asphalt a softening point within this range. Air blowing enhances the high-temperature performance of the asphalt and provides other advantages.

The asphaltic material is added to the polymeric material in an amount sufficient to modify it by lowering the viscosity of the composition for fiberizing. The composition comprises from about 30% to about 85% polymeric material and from about 15% to about 70% asphaltic material (by weight). Preferably, the composition comprises from about 30% to about 60% polymeric material and from about 40% to about 70% asphaltic material, and more preferably from about 30% to about 40% polymeric material and from about 60% to about 70% asphaltic material. The combined materials are preferably in the form of a blend. However, there may be some chemical interaction between the polymeric material and asphaltic material when they are combined.

The optimum amount of polymeric material in the composition depends on the melt flow index of the polymeric material, as well as other factors such as the composition of the polymeric material, the composition of the asphaltic material, and any chemical interaction between the materials. The final composition may contain a greater amount of polymeric material when the melt flow index of the material is higher, and a lesser amount of the polymeric material when the melt flow index of the material is lower. For example, when the polymeric material has a melt flow index below about 20 grams/10 minutes, the composition may comprise from about 30% to about 60% polymeric material and from about 40% to about 70% asphaltic material by weight. On the other hand, when the polymeric material has a melt flow index from about 20 grams/10 minutes to about 35 grams/10 minutes, the composition may comprise from about 50% to about 85% polymeric material and from about 15% to about 50% asphaltic material by weight.

Preferably, the combined ingredients form a composition having a melt flow index from about 80 grams/10 minutes to about 800 grams/10 minutes, and more preferably from about 100 grams/10 minutes to about 200 grams/10 minutes, as measured at 230° C. under a 2.16 kg load according to ASTM D 1238 Method B. Preferably, the addition of the asphaltic material to the polymeric material raises the melt flow index by at least about 45 grams/10 minutes.

Not only does the addition of the asphaltic material allow the polymeric material to be readily fiberized, but the addition of the asphaltic material also permits the inclusion of fillers, modifiers, and other materials that tend to increase the viscosity of the composition. These materials can be added so long as the resulting composition is suitable for fiberizing. For example, the composition may contain additional ingredients, such as: fillers, e.g., calcium carbonate, carbon black, and clay; modifiers, e.g., antioxidants, surface modifiers, and plasticizers or other materials for enhancing flow.

The polymeric material and asphaltic material can be combined by any method suitable for blending the materials together. Typically, the two materials are blended at an elevated temperature in an extruder, such as a twin-screw compounding extruder. The extruder preferably forms compounded pellets of the materials. The pellets can be melted and pumped into a rotary fiberizer by any appropriate method, such as with a single-screw extruder. The molten asphalt-modified polymeric material is then fiberized by a rotary process, such as one described above, or by any other suitable process for forming fibers, such as a textile process or a melt-blowing process.

The product fibers of the invention are good-quality fibers suitable for many applications. Advantageously, the fibers are not tacky at temperatures below about 130° C.; the composition preferably is not tacky at temperatures below about 130° C. according to ASTM D 2131. The fibers are preferably also low-shot, i.e., they contain not more than a low amount of nonfibrous material, such as large, nonfibrous particles of the asphalt/polymer composition. Preferably, the fibers contain not more than about 10% nonfibrous material by weight, e.g., based on optical and/or flow-resistance measurements. The fibers also have relatively good strength. Preferably, the fibers have an individual fiber tensile strength of at least about 6.9 MPa as measured by ASTM D 3822. Fibers made from polymers and asphalt according to the invention preferably have an attractive black color.

Figure 4:
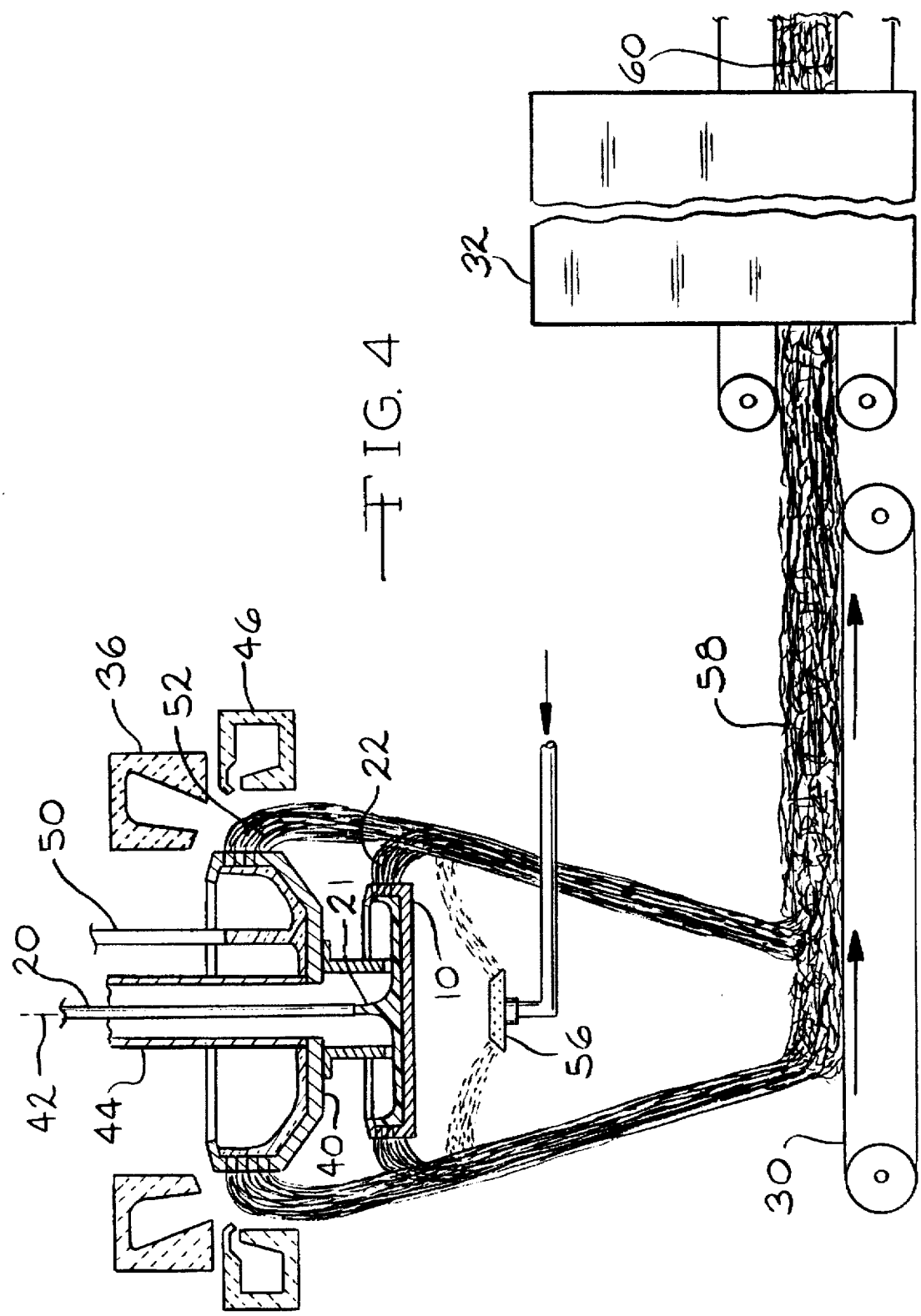
FIG. 4 is a schematic sectional view in elevation of an apparatus for cofiberizing asphalt-containing polymeric fibers and mineral fibers according to the method of the invention.

The process for fiberizing the asphalt/polymer composition using a rotating spinner can be used in combination with a rotary mineral fiber-forming process to integrate or commingle asphalt-modified polymeric fibers with mineral fibers. For example, as shown in FIG. 4, spinner 10 for producing asphalt/polymer fibers 22 is positioned beneath a conventional mineral spinner 40 for producing mineral fibers 52. The mineral fibers can be formed of any suitable mineral material, such as glass, rock wool, slag wool, and basalt. The spinner 10 is preferably mounted beneath the bottom wall of the mineral spinner 40 for coaxial rotation with the mineral spinner on axis 42. Molten asphalt/polymer material is discharged through delivery tube 20 as stream 21 through hollow quill 44, which rotatably supports the mineral spinner 40. Attenuation of the fibers can be facilitated by annular blower 46 and annular burner 36 in a manner generally known in the art of making fibers.

Molten mineral material is dropped as stream 50 into the mineral spinner 40, is centrifuged as mineral fibers 52, and is turned downward as a flow or veil of fibers and gases (as shown in FIG. 5). An additive means, such as binder nozzle 56, can be positioned within the veil or outside the veil, for applying any binder or other coating or particles as desired, or for supplying liquid for cooling the fibers.

In operation, the organic fibers 22 are distributed radially outwardly from the spinner 10, are intermingled with the mineral fibers 52 in the veil, and are collected on the conveyor 30 as an intermingled mass 58 of organic fibers and mineral fibers. Since the mineral fiber-forming process operates at temperatures above the softening point of the mineral, the area surrounding and immediately below the mineral spinner 40 is very hot. It is possible that some of the organic fibers 22 will be entrained in some of the hot gases flowing with the veil of fibers, and thereby experience temperatures sufficient to soften or melt the organic fibers. In such a case, some of the organic material may attach itself to some of the mineral fibers to form organic material particles on the mineral fibers. The organic material may also be in the form of a coating on some of the mineral fibers. Care should be taken not to introduce the organic material into a region with temperatures so hot as to ignite the organic material. The mass of intermingled organic fibers and mineral fibers can be transported to any suitable processing station, such as oven 32, before becoming organic/mineral fiber product 60.

As an alternative to the coaxial fiberizing shown in FIG. 4, alternate commingling of veils of organic fibers and mineral fibers can also be used, as shown in FIG. 5. The organic fibers can be integrated with the mineral fibers by centrifuging mineral fibers from one or more rotary mineral spinners 40, which are supplied with molten mineral material by any suitable delivery means, such as forehearth 66, to establish one or more downwardly moving veils 54 of mineral fibers. The mineral-fiber veils are positioned above collecting surface 30, and the veils of mineral fibers are aligned generally along the length of the collecting surface. Organic fibers are centrifuged by one or more rotary spinners 10 to establish one or more downwardly moving veils 25 also positioned above the collecting surface. The organic material can be supplied in molten form from a common source, such as supply conduit 68. The veils of organic fibers are aligned along the length of the collecting surface, generally colinearly with the veils of mineral fibers, in an alternating fashion with the veils of mineral fibers. The result is that the organic fibers and mineral fibers intermingle and are collected as integrated organic fibers and mineral fibers. Subsequently, the integrated organic fibers and mineral fibers can be further processed into a desired organic/mineral-fiber product. In an alternative embodiment, a single spinner 10 for organic material is positioned between a pair of mineral spinners 40.

The organic/mineral-fiber product is useful for a variety of different applications. For example, the product is useful as a stress-absorbing membrane interlayer in various construction applications, such as highways. The product is also useful as a sound-absorbing material, as thermal or acoustical insulation, as a reinforcing mat, and as a gasket or sealant.

The organic/mineral-fiber product can be subjected to a compressing or consolidation step which forms a denser product. Prior to consolidation, the product preferably has a density from about 32 kg/m³ to about 240 kg/m³, while after consolidation the product preferably has a density from about 1040 kg/m³ to about 1920 kg/m³. The consolidated product may have uses in various products, such as vibration-damping material, molding material, insulation, and floor-tile substrates. The product is also useful in a relofted form, which may be achieved by initially compressing to a dense state, placing into a compressed space such as a cavity of an automobile body, and then reheating to expand and thereby fill and conform to the shape of the cavity.

The organic fibers of the invention may be used to make products such as shingles. For example, the organic fibers may be used to make products similar to the asphaltic products discussed in U.S. Pat. No. 5,494,728, the disclosure of which is hereby incorporated by reference.

The organic fibers of the invention, preferably without mineral fibers, may be made into other useful products, such as containers. Advantageously, consumable containers for holding asphalt and like products, such as those disclosed in U.S. patent application Ser. No. 08/657,83 1, filed May 31, 1996, the disclosure of which is incorporated by reference herein, may be made from the organic fibers. The container is consumable so that it can be melted right along with asphalt held in the container without requiring undue mixing, and without significantly changing the properties of the asphalt. The consumable container holding asphalt is useful, e.g., to place in a roofers kettle as needed to supply more asphalt for roofing.

Preferred embodiments of the invention are set forth by the following examples.

EXAMPLE I

Polypropylene and asphalt were pelletized in a twin-screw compounding extruder at a ratio of 40:60 by weight. The polypropylene was Profax 6301 having a melt flow index of 12 grams/10 minutes measured at 230° C. under a 2.16 kg load according to ASTM D 1238 Method B (available from Montel of Wilmington, Del.). The asphalt was an AC-20 paving-grade asphalt air-blown to a softening point of 121 ° C. (available from Amoco Oil of Naperville, Ill.) The extruder was a 40 -mm co-rotating, intermeshing twin-screw extruder manufactured by Werner Pfleiderer (Ramsey, N.J.) The screw temperature was set at 177° C. The combined polypropylene and asphalt had a melt flow index of about 100 as measured at 230° C. under a 2.16 kg load according to ASTM D 1238 Method B. The compounded pellets were melted at 260° C. with a single-screw extruder (manufactured by Akron Extruders of Canal Fulton, Ohio) and pumped into a rotary spinner. The spinner had a diameter of 38.1 centimeters and was rotated at 2000 RPM's (revolutions per minute). The spinner had 850 orifices in the peripheral wall, with each orifice having a diameter of 0.86 millimeters. The temperature of the peripheral wall of the spinner was 260° C. The molten material was centrifuged through the orifices of the spinner to form primary fibers. The primary fibers were further attenuated by an annular blower to make final fibers having an average diameter of 15 microns with a 0.7 coefficient of variation.

The resulting fibers were black in color. The fibers were not tacky at temperatures below 130° C., and contained not more than 10% nonfibrous material by weight. The fibers had an individual fiber tensile strength of about 34.5 MPa.

EXAMPLE II

An asphalt-modified polypropylene was cofiberized with glass fibers using apparatus similar to that shown in FIG. 4. Polypropylene and asphalt were pelletized in a twin-screw compounding extruder at a ratio of 30:70 by weight. The polypropylene was Profax 6301 having a melt flow index of 12 grams/10 minutes, and the asphalt was a roofing flux asphalt air-blown to a softening point of 121 ° C. (available from Lagovan Oil Co., Venezuela). The extruder was a 40-mm co-rotating, intermeshing twinscrew extruder manufactured by Werner Pfleiderer, with the screw temperature set at 177° C. The combined polypropylene and asphalt had a melt flow index of about 100 as measured at 230° C. under a 2.16 kg load according to ASTM D 1238 Method B. The compounded pellets were melted at 260° C. with a single-screw extruder and pumped into a rotary spinner through a discharge tube. The spinner had a diameter of 38.1 centimeters and was rotated at a speed of 2000 RPM's. The spinner had 850 orifices in the peripheral wall, with each orifice having a diameter of 0.86 millimeters. The temperature of the peripheral wall of the spinner was 260° C. The molten material was centrifuged through the orifices of the spinner to form primary, organic fibers. The primary fibers were further attenuated by an annular blower to make final fibers having an average diameter of 10 microns with a 1.0 coefficient of variation.

The spinner for producing the organic fibers was positioned beneath a conventional glass spinner. Molten glass was dropped as a stream into the glass spinner and was centrifuged as glass fibers, and the glass fibers were turned downwardly as a veil. The organic (asphalt/polypropylene) fibers were distributed radially outwardly from the spinner and intermingled with the glass fibers in the veil. The fibers were collected on a conveyor as an intermingled mass of organic fibers and glass fibers. The relative feed rates of the glass and organic were controlled so that the fiber product, by weight, was composed of 30% glass and 70% organic material. The product was a gray/black wool material having a loft similar to fiberglass wool insulation. The wool product had a density of about 40 kg/m³. The wool could be molded with heat into a board material having a density of about 1470 kg/m³.

While the invention has been described in reference to the above examples and preferred embodiments, suitable modifications will become apparent to those skilled in the art. Accordingly, the invention is intended to be defined not by the above detailed description, but by the appended claims and their equivalents.

What is claimed is:

1. A fiber product comprising monofilaments each having an average diameter of about 60 microns or less and being made from a mixture comprising (a) from about 30 percent by weight to about 85 percent by weight of a polymeric material having a melt flow index of about 35 grams/10 minutes or below and (b) from about 15 percent by weight to about 70 percent by weight of an asphaltic material.

2. A fiber product as defined in claim 1, wherein said mixture has a melt flow index of from about 80 grams/10 minutes to about 8800 grams/10 minutes.

3. A fiber product as defined in claim 1, wherein the asphaltic material comprises an asphalt having a softening point of from about 82° C. to about 177° C.

4. A fiber product as defined in claim 1, wherein the asphaltic material is roofing flux asphalt or paving-grade asphalt.

5. A fiber product as defined in claim 1, wherein the polymeric material is a polymer selected from the group consisting of polypropylene, polyethylene, polystyrene, polyesters, ethylene copolymers, acrylates, methacrylates, and mixtures thereof.

6. A fiber product as defined in claim 1, wherein the mixture comprises from about 30 percent by weight to about 60 percent by weight of the polymeric material and from about 40 percent by weight to about 70 percent by weight of the asphaltic material, and said melt flow index of the polymeric material is below about 20 grams/10 minutes.

7. A fiber product as defined in claim 1, wherein the mixture comprises from about 50 percent by weight to about 85 percent by weight of the polymeric material and from about 15 percent by weight to about 50 percent by weight of the asphaltic material, and the polymeric material has a melt flow index of from about 20 grams/10 minutes to about 35 grams/10 minutes.

8. A fiber product as defined in claim 1, wherein the asphaltic material is an air-blown asphalt having a softening point of from about 93° C. to about 132° C.

9. A fiber product as defined in claim 1, wherein the mixture is not tacky at temperatures below about 130° C.

10. A fiber product as defined in claim 1, wherein the monofilament contain no more than about 10 percent by weight of fillers, modifiers, plasticizer or flow enhancers.

11. A fiber product as defined in claim 1, wherein the monofilaments have an individual fiber tensile strength of at least about 6.9 Mpa.

12. A fiber product as defined in claim 1, wherein said average diameter is from about 5 microns to about 20 microns.

13. A fiber product as defined in claim 1, further comprising mineral fibers intermingled with said organic fibers.

14. A fiber product as defined in claim 1, wherein said polymeric material is polypropylene having a melt flow index of from about 5 grams/10 minutes to about 15 grams/10 minutes, and said asphaltic material is a roofing flux asphalt or paving-grade asphalt.

15. A fiber product as defined in claim 14, wherein the mixture comprises from about 30 percent by weight to about 40 percent by weight of the polypropylene and from about 60 percent by weight to about 70 percent by weight of the asphalt.

* * * * *